June 4, 1968

J. O. FOURR 3,387,182

APPARATUS FOR PROTECTING ELECTRICAL POWER EQUIPMENT FROM DAMAGE
DUE TO TOO FREQUENT REPETITION OF START CONDITIONS

Filed Jan. 18, 1966

INVENTOR.
J. O. FOURR
BY Harry A. Herbert Jr.
ATTORNEY

James S. Shannon
AGENT

United States Patent Office

3,387,182
Patented June 4, 1968

3,387,182
APPARATUS FOR PROTECTING ELECTRICAL POWER EQUIPMENT FROM DAMAGE DUE TO TOO FREQUENT REPETITION OF START CONDITIONS
James O. Fourr, P.O. Box 101, Boron, Calif. 93516
Filed Jan. 18, 1966, Ser. No. 521,459
3 Claims. (Cl. 317—40)

ABSTRACT OF THE DISCLOSURE

A thermally actuated manually reset circuit breaker having an electrical heating element is connected in the energizing circuit of the electrical equipment to be protected. The heating element is connected to the equipment through a normally closed delay switch for energization whenever the equipment is energized and the delay switch is closed. A delay mechanism actuated by energization of the equipment opens the delay switch a predetermined fixed time interval after the initiation of any period of energization of the equipment and holds it open for the duration of the energization period. If the intervals of heating element energization come too frequently, sufficient heat accumulates in the circuit breaker to actuate it.

Figure 1:
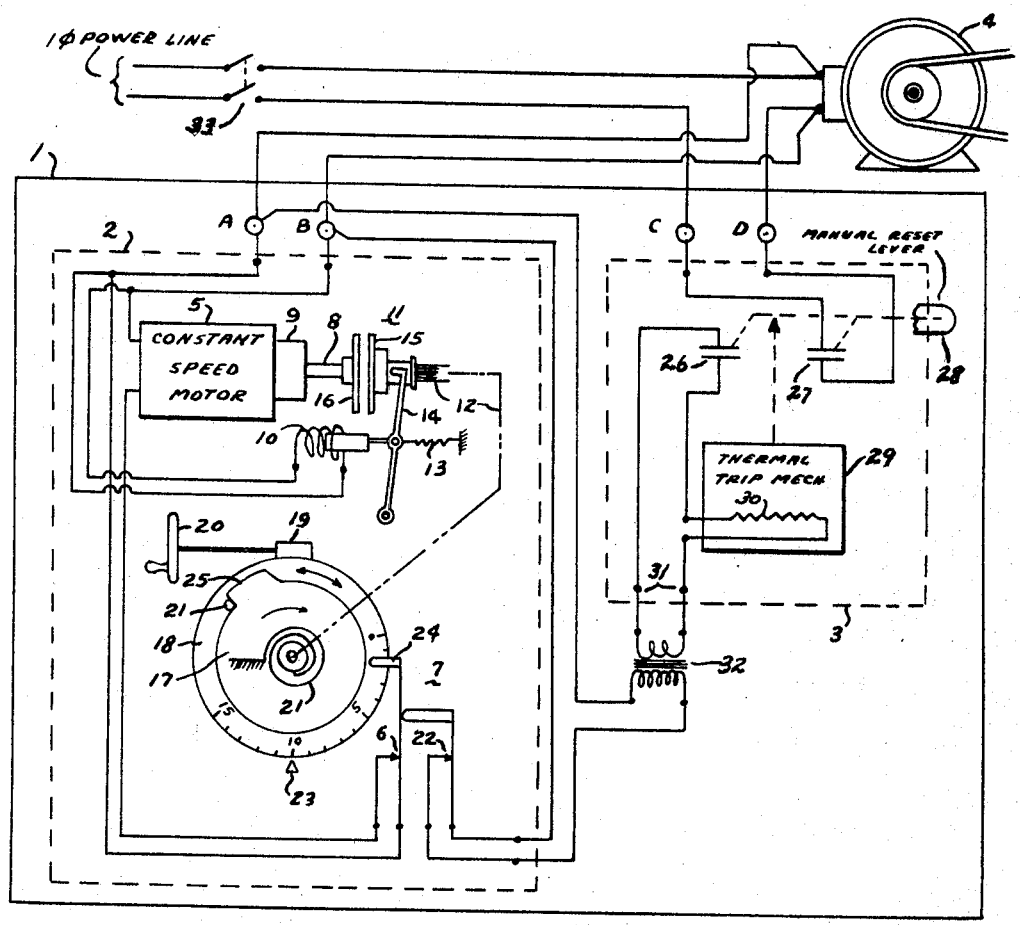

The invention described herein may be manufactured and used by or for the United States Government for governmental purposes without the payment to me of any royalty thereon.

The purpose of this invention is to provide apparatus for protecting electrical power equipment from damage resulting from too frequent repetition of the start conditions. It is applicable to any piece of electrical power equipment in which the current load when the equipment is started in considerably greater than the normal running current load. Such equipment is designed to withstand the starting conditions normally, but, if the start-stop cycle is repeated too frequently, i.e. without sufficient time between starts to permit the heat due to the high starting current to dissipate, a heat accumulation may occur of sufficient severity to burn out or otherwise damage the equipment. The protective device is particularly applicable to electric motors used to drive refrigeration or other compressors which require a high starting torque resulting in high motor starting current. A further purpose of the invention is to provide a protective device of the above type that is entirely external to and requires no modification of the equipment being protected.

Briefly described, the protective device comprises an electrically driven delay switch and a thermally actuated manually resettable circuit breaker, the latter controlling the application of power to the protected equipment. When voltage is applied to the delay switch it operates to open a normally closed set of contacts after a predetermined delay. Removal of voltage from the delay switch at any time resets it to the start of its delay interval.

Whenever voltage is applied to the equipment being protected it is also applied to both the delay switch drive circuit and, through the normally closed delay switch contacts, to a heating element in the thermally actuated trip mechanism of the circuit breaker. At the expiration of the delay set into the delay switch, the trip mechanism heating element is deenergized by the opening of the delay switch contacts. Under initial start conditions, the heating of the trip mechanism during one delay interval is insufficient to trip the circuit breaker. However, under repeated start conditions, if too many starts are attempted in too short a time period, the heat received by the thermal trip mechanism during the intervals between starts exceeds the heat dissipated, and the resulting net gain in heat eventually trips the circuit breaker, removing power from the protected equipment. Power may not then be restored to the equipment until the trip mechanism has cooled to the point where the circuit breaker can be manually reset. Ideally, the cooling rate of the trip mechanism is made such that the circuit breaker cannot be reset until the equipment temperature has fallen to a safe starting level. The frequency with which starts may be attempted without tripping the circuit breaker can be controlled by adjusting the delay interval of the delay switch, the shorter the interval the greater the frequency. This permits the device to be adapted to the requirements of any particular piece of electrical equipment.

Figure 2:
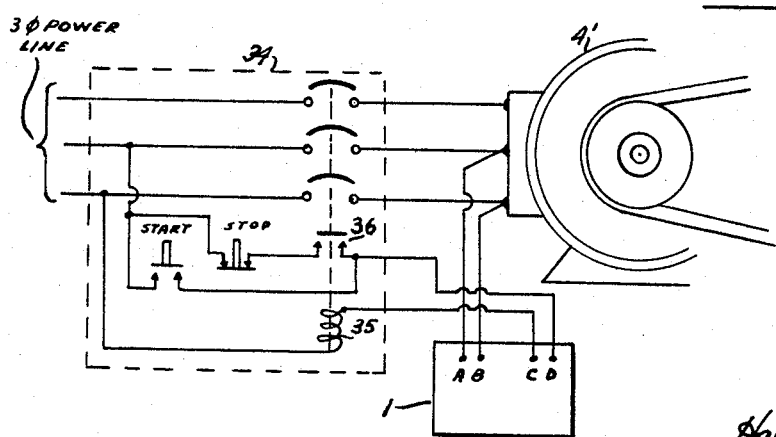

A more detailed description of the invention will be given with reference to the specific embodiment thereof shown in the accompanying drawing, in which:

FIG. 1 shows schematically the details of a protective device in accordance with the invention, and the manner of connecting it to protect a relatively small single phase motor, and FIG. 2 shows a representative manner of connecting the protective device of FIG. 1 to protect larger motors the energization of which is controlled by an electrically actuated switch or motor controller.

Referring to FIG. 1, the protective device 1 in accordance with the invention comprises a delay switch 2 and a thermally tripped manually resettable circuit breaker 3. The protective device is provided with four terminals, A, B, C, and D, for connection to the power supply circuit of the piece of electrical equipment to be protected, in this case a relatively low power single phase electric motor 4 which may be used, for example, to drive the compressor of a refrigeration system.

The delay switch 2 may be of any suitable design meeting the requirements: (1) that it open a set of normally closed contacts after voltage has been continuously applied to its actuating circuit for a predetermined interval of time, and (2) that it immediately reset to the start of its delay interval whenever voltage is removed from its actuating circuit. Delay switches meeting these requirements are commercially available.

Although the specific design of delay switch 2 is not part of the invention, one suitable design is shown schematically in FIG. 1 to aid in a better understanding of the operation of the protective device. In this design a constant speed motor 5, when energized from terminals A–B through normally closed limit switch contacts 6 of cam operated switch 7, drives shaft 8 through a reduction gear set 9 at a low speed. Also, whenever a voltage is present at terminals A–B, coil 10 of magnetically actuated friction clutch 11 is energized causing this normally disengaged clutch to couple shaft 8 to shaft 12 for driving the latter at the same speed as shaft 8. When voltage is removed from terminals A–B deenergizing coil 10, the clutch is immediately disengaged by spring 13 which, acting through fork 14, causes driven disc 15 to disengage driving disc 16 by sliding backward on the splined end of shaft 12.

Cam 17 is mounted on shaft 12 for rotating therewith. Gear 18 is slidably mounted on shaft 12 and is adjustable in angular position, and held in the angular position to which adjusted, by worm 19 which may be rotated by crank wheel 20. As a result, pin 21 in gear 18 acts as an angularly adjustable counterclockwise stop for cam 17 which has a constantly applied counterclockwise torque due to spiral spring 21. Switch 7, which is actuated by cam 17, has, in addition to the already mentioned limit contacts 6, a set of normally closed contacts 22 for connection in an external circuit. The interval of time in seconds required for cam 17 to rotate from its position against stop 21 to the position at which contacts 22 open may be marked off on gear 18 opposite index 23. Contacts 6 are designed to open after contacts 22 but before the cam follower 24 has reached the highest level 25 of the cam.

Considering the operation of delay switch 2, when voltage is applied to terminals A–B motor 5 and coil 10 of clutch 11 are energized causing shaft 12 and cam 17 to be driven in a clockwise direction at constant speed. After an interval of time that is determined by the position of stop 21, cam 17 actuates switch 7 to first open contacts 22 and then to open limit contacts 6, the latter deenergizing motor 5. Cam 17 remains in this position and contacts 6 and 22 remain open for as long as voltage is applied to terminals A–B, since clutch 11 remains engaged and spring 21 is not powerful enough to rotate motor 5 backward through reduction gear set 9. When the voltage at terminals A–B is removed, coil 10 is deenergized, clutch 11 is disengaged by spring 13, and spring 21 rotates cam 17 backwards to its counterclockwise stop 21 permitting contacts 6 and 22 to reclose.

The circuit breaker 3 has two sets of contacts 26 and 27 which may be manually closed by a reset lever 28. The thermal trip mechanism 29 operates to open these contacts whenever the temperature of the heat sensitive actuating element of the mechanism reaches a certain level. Heat is supplied to the actuating element of the mechanism by a resistive heating element 30 which receives current through contacts 26 and terminals 31. Circuit breakers of this type are available commercially, an example being the General Electric CR101 heater switch.

In the protective device 1, the heating voltage applied to terminals 31 of circuit breaker 3 is derived from terminals A–B, being applied through contacts 22 of switch 7 and through a voltage reducing transformer 32 if necessary.

In order to utilize the device 1 to protect a particular piece of electrical equipment, the energizing voltage applied to the equipment is also applied to terminals A–B of the protective device, and the terminals C–D of the protective device are so connected to the energizing circuit of the equipment that the opening of contacts 27 deenergizes the equipment. Whether full line voltage is applied to terminals A–B and full line current to terminals C–D, as in FIG. 1, depends upon practical considerations. If necessary, the voltage at terminals A–B may be reduced by a transformer (not shown) and terminals C–D may be connected in the control circuit of an electrically actuated switch, as in FIG. 2 referred to later. For the relatively low power motor 4, illustrated in FIG. 1, full line voltage is applied to terminals A–B and line current flows between terminals C–D through contacts 27.

Considering the operation of the protective device 1 in the application illustrated in FIG. 1, it will be first assumed that line switch 33 has been open long enough for motor 4 and trip mechanism 29 to have cooled to ambient temperature. With circuit breaker 3 closed, closure of switch 33 energizes motor 4 through contacts 27 of the circuit breaker and applies line voltage to terminals A–B. The voltage at A–B energizes delay switch 2 and also heating element 30 through closed contacts 22, transformer 32 and closed contacts 26. After the delay interval to which switch 2 has been set, 10 seconds in the example given, has expired, contacts 22 open deenergizing heating element 30. In a start from ambient temperature conditions, or from a temperature condition low enough that an additional start would not endanger the equipment, this occurs before the trip mechanism has been heated enough to open the circuit breaker 3. If switch 33 is allowed to remain closed for a sufficient length of time, the windings of motor 4, which initially heated rapidly due to the high starting current, gradually fall to normal running temperature, and trip mechanism 29 of circuit breaker 3 gradually returns to ambient temperature. When the motor is stopped by opening switch 33, voltage is removed from terminals A–B which immediately resets the timer by releasing clutch 11, thereby allowing cam 17 to rotate backward under the influence of spring 21 to its counterclockwise stop 21. This reset action also closes contacts 6 and 22.

As seen above, starts from ambient or sufficiently low temperature conditions will not cause circuit breaker 3 to trip. However, each time switch 33 is closed, heating element 30 in the circuit breaker is energized until the end of the full delay interval of switch 2 (or until switch 33 is opened, whichever occurs first). Therefore, if any residual heat above ambient temperature is present in trip mechanism 29 when switch 33 is closed, this is added to and the resulting temperature of the trip mechanism at the end of the interval (or the opening of switch 33) is higher than it would have been had the mechanism been at ambient temperature when the start was made. Consequently, if a succession of starts is attempted with insufficient time lapse between starts to allow the added heat to dissipate, there is a net gain in the temperature of the trip mechanism which, if carried far enough, causes the circuit breaker to open and remove power from motor 4. The parameters of the system are so selected that this occurs before the motor is damaged by the overheating effect of the succession of high starting current conditions.

The parameters affecting the operation of the protective device 1 are the heating and cooling rates of thermal trip mechanism 29 and the delay of switch 2. Usually, the heating and cooling rates are fixed parameters, although, as stated earlier, it is preferable that the cooling rate of the trip mechanism be related to that of the equipment being protected in such a way that the circuit breaker cannot be reset until the temperature of the equipment has fallen to a safe starting level. The delay of switch 2 is made a variable parameter for adapting the device to the requirements of a particular piece of equipment. At zero delay no heating of the trip mechanism occurs, since contacts 22 open immediately, and the minimum interval (theoretically zero) between starts is permissible. As the delay is increased from zero, more heating of the trip mechanism occurs for each start, and the interval required between starts to prevent actuating of circuit breaker 3 increases.

As stated earlier, for higher power applications contacts 27 of the circuit breaker 3 may not be able to carry the line current. In this case, these contacts may be used to control an electrically actuated line switch. A simple example of such an arrangement is shown in FIG. 2. Here, 4' is a relatively large 3φ motor and 34 is an electrically actuated switch between this motor and the 3φ power line. The protective device 1 is identical to that shown in FIG. 1. Momentary closure of the normally open START switch energizes coil 35 through contacts 27 (FIG. 1) located between terminals C–D. This actuates the 3-pole switch and establishes a holding circuit containing, in series, the normally closed STOP switch, holding contacts 36 and contacts 27 between terminals C–D. Should circuit breaker 3 in protective device 1 trip, contacts 27 would open breaking the holding circuit and disconnecting the motor from the line. Since contacts 27 are also in the start circuit, the switch 37 cannot be actuated to connect the motor to the line until circuit breaker 3 in device 1 has been reset.

I claim:

1. A protective device for electrical power equipment, said device comprising: a circuit breaker having contacts connected to remove the electrical energization from said equipment when open, said circuit breaker having a thermally actuated trip mechanism with a resistive heating element and a manual reset mechanism; and means connected to said equipment and to said heating element and responsive to the electrical energization of said equipment for applying electrical energy to said heating element for not longer than a predetermined fixed time interval starting at the initiation of any period of energization of said equipment.

2. A protective device for electrical power equipment, said device comprising: a first pair of terminals for connection to the energizing circuit of said power equipment to receive a voltage therebetween proportional to the energizing voltage of said equipment; a second pair of terminals for connection to the energizing circuit for said equipment for removing the energization of said equipment when an open circuit exists between said terminals; a delay switch having a pair of normally closed contacts, said switch being connected to said first pair of terminals and having a delay mechanism actuated by a continuously applied voltage therebetween to open said normally closed contacts after a predetermined delay, said switch also being operative to immediately reset said delay mechanism and to reclose said contacts upon removal of the voltage between said first pair of terminals; a manually resettable circuit breaker having a pair of contacts connected between said second pair of terminals, said circuit breaker having a thermally actuated trip mechanism with a resistive heating element for opening said contacts when the temperature of said trip mechanism reaches a predetermined level; and means for applying electrical energy from said first pair of terminals to said trip mechanism heating element through the normally closed contacts of said delay switch.

3. Apparatus as claimed in claim 2 in which the delay of said delay switch is adjustable in order to adapt the protective device to the requirements of a particular piece of electrical equipment.

References Cited

UNITED STATES PATENTS

| | | | |
|---|---|---|---|
| 2,379,602 | 7/1945 | Stickel | 318—221.3 |
| 2,516,538 | 7/1950 | Armstrong | 317—13 |
| 2,521,120 | 9/1950 | Harrold | 317—13 |
| 2,539,179 | 1/1951 | Bevis et al. | 317—13.1 |
| 2,722,644 | 11/1955 | Clark | 318—221 |
| 3,004,203 | 10/1961 | Epstein | 317—13 |

LEE T. HIX, *Primary Examiner.*

R. V. LUPO, *Assistant Examiner.*